(12) United States Patent
Walter et al.

(10) Patent No.: US 10,505,985 B1
(45) Date of Patent: Dec. 10, 2019

(54) HOSTNAME VALIDATION AND POLICY EVASION PREVENTION

(71) Applicant: Palo Alto Networks, Inc., Santa Clara, CA (US)

(72) Inventors: Martin Walter, Livermore, CA (US); Charles Bransi, San Jose, CA (US); Suiqiang Deng, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 115 days.

(21) Appl. No.: 15/486,204

(22) Filed: Apr. 12, 2017

Related U.S. Application Data (60) Provisional application No. 62/322,183, filed on Apr. 13, 2016.

(51) Int. Cl.
| | | |
|---|---|---|
| *G06F 17/00* | (2019.01) | |
| *H04L 29/06* | (2006.01) | |
| *H04L 29/12* | (2006.01) | |
| *H04L 29/08* | (2006.01) | |
| *G06F 16/2453* | (2019.01) | |

(52) U.S. Cl.
CPC ........ *H04L 63/20* (2013.01); *G06F 16/24539* (2019.01); *H04L 61/1511* (2013.01); *H04L 63/0263* (2013.01); *H04L 63/10* (2013.01); *H04L 63/166* (2013.01); *H04L 67/02* (2013.01); *H04L 67/14* (2013.01)

(58) Field of Classification Search
CPC ..... H04L 63/20; H04L 67/02; H04L 61/1511; H04L 67/14; H04L 63/166; H04L 63/10; H04L 63/0263; G06F 17/30457
See application file for complete search history.

(56) References Cited

U.S. PATENT DOCUMENTS

| | | |
|---|---|---|
| 7,181,506 B1 | 2/2007 | Vigue |
| 7,792,994 B1 | 9/2010 | Hernacki |
| 7,849,502 B1 | 12/2010 | Bloch |
| 7,849,507 B1 | 12/2010 | Bloch |
| 7,984,163 B2 | 7/2011 | Almog |
| 8,447,856 B2 | 5/2013 | Drako |
| 9,021,085 B1 | 4/2015 | Jensen |

(Continued)

FOREIGN PATENT DOCUMENTS

| | | |
|---|---|---|
| JP | 2007226608 | 9/2007 |
| JP | 2008538883 | 11/2008 |

(Continued)

OTHER PUBLICATIONS

Barth et al., Robust Defenses for Cross-Site Request Forgery, CCS'08, Oct. 27-31, 2008, pp. 75-87.

(Continued)

*Primary Examiner* — Trong H Nguyen
(74) *Attorney, Agent, or Firm* — Van Pelt, Yi & James LLP (57) ABSTRACT

A request to access a network resource is received from a client device. The request includes a purported hostname of the network resource. A Domain Name System (DNS) lookup of the purported hostname is performed. A result of the lookup is used in making a determination that the request received from the client device is invalid. In response to the determination being made that the request received from the client device is invalid, an action to take with respect to the client device is determined.

24 Claims, 4 Drawing Sheets

(56) References Cited

U.S. PATENT DOCUMENTS

| | | | |
|---|---|---|---|
| 9,756,071 | B1* | 9/2017 | Golshan ............... G06F 16/951 |
| 2001/0052007 | A1 | 12/2001 | Shigezumi |
| 2005/0021999 | A1* | 1/2005 | Touitou ............... H04L 63/1458 |
| | | | 726/11 |
| 2005/0235044 | A1 | 10/2005 | Tazuma |
| 2006/0167871 | A1* | 7/2006 | Sorenson ............ H04L 29/1216 |
| 2007/0033264 | A1* | 2/2007 | Edge ................ H04L 29/12066 |
| | | | 709/217 |
| 2007/0180090 | A1 | 8/2007 | Fleischman |
| 2007/0204040 | A1 | 8/2007 | Cox |
| 2007/0214283 | A1 | 9/2007 | Metke |
| 2008/0147837 | A1* | 6/2008 | Klein ................ H04L 29/12066 |
| | | | 709/223 |
| 2008/0209057 | A1 | 8/2008 | Martini |
| 2009/0037976 | A1 | 2/2009 | Teo |
| 2009/0055929 | A1 | 2/2009 | Lee |
| 2009/0249484 | A1 | 10/2009 | Howard |
| 2010/0049985 | A1 | 2/2010 | Levow |
| 2010/0131646 | A1 | 5/2010 | Drako |
| 2010/0318681 | A1 | 12/2010 | Shi |
| 2010/0319069 | A1 | 12/2010 | Granstedt |
| 2011/0010426 | A1 | 1/2011 | Lalonde |
| 2011/0035469 | A1 | 2/2011 | Smith |
| 2011/0119306 | A1 | 5/2011 | Patil |
| 2011/0167474 | A1 | 7/2011 | Sinha |
| 2011/0182291 | A1 | 7/2011 | Li |
| 2011/0247073 | A1 | 10/2011 | Surasathian |
| 2012/0084423 | A1 | 4/2012 | McGleenon |
| 2012/0173684 | A1 | 7/2012 | Courtney |
| 2012/0203904 | A1 | 8/2012 | Niemelá |
| 2013/0198511 | A1* | 8/2013 | Yoo ..................... H04L 63/0823 |
| | | | 713/156 |
| 2015/0271132 | A1* | 9/2015 | Erb ..................... H04L 61/1511 |
| | | | 709/223 |
| 2017/0126714 | A1* | 5/2017 | Nooka ................ H04L 63/1425 |
| 2018/0026935 | A1* | 1/2018 | Ripke ................. H04L 61/1511 |
| | | | 709/213 |

FOREIGN PATENT DOCUMENTS

| | | |
|---|---|---|
| JP | 2009271842 | 11/2009 |
| JP | 2013501466 | 1/2013 |
| WO | WO-0161922 | 8/2001 |
| WO | WO-0215491 | 2/2002 |
| WO | WO-2006114367 | 11/2006 |
| WO | 2007003818 A1 | 1/2007 |
| WO | WO-2011017427 | 2/2011 |

OTHER PUBLICATIONS

Jackson et al., Protecting Browsers from DNS Rebinding Attacks, ACM Transactions on the Web, Jan. 2009, pp. 1-26, vol. 3, No. 1, Article 2.

Shbair et al., Efficiently Bypassing SNI-based HTTPS Filtering, 2015 IFIP/IEEE International Symposium on Integrated Network Management (IM2015): Experience Session Paper, 2015, pp. 990-995.

Guy Bruneau, "DNS Sinkhole", SANS Institute InfoSec Reading Room, Aug. 7, 2010, XP055168392, http://www.sans.org/reading-room/whitepapers/dns/dns-sinkhole-33523.

Wazen M. Shbair, Thibault Cholez, Antoine Goichot, and Isabelle Chrisment. "Efficiently bypassing SNI-based HTTPS filtering." In 2015 IFIP/IEEE International Symposium on Integrated Network Management (IM), pp. 990-995. IEEE, 2015.

* cited by examiner

HOSTNAME VALIDATION AND POLICY EVASION PREVENTION

CROSS REFERENCE TO OTHER APPLICATIONS

This application claims priority to U.S. Provisional Patent Application No. 62/322,183 entitled HOSTNAME VALIDATION AND POLICY EVASION PREVENTION filed Apr. 13, 2016 which is incorporated herein by reference for all purposes.

BACKGROUND OF THE INVENTION

Firewalls and other security devices/programs typically enforce policies against network transmissions based on a set of rules. In some cases, the rules may be based on hostname information, such as by preventing a user from accessing a specific website (e.g., denying access to http://www.example.com), or by preventing a user from accessing a category associated with the website (e.g., denying access to sites classified as "social networking" sites or "pornographic" sites). Unfortunately, techniques exist for evading hostname-related filtering.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Figure 1:
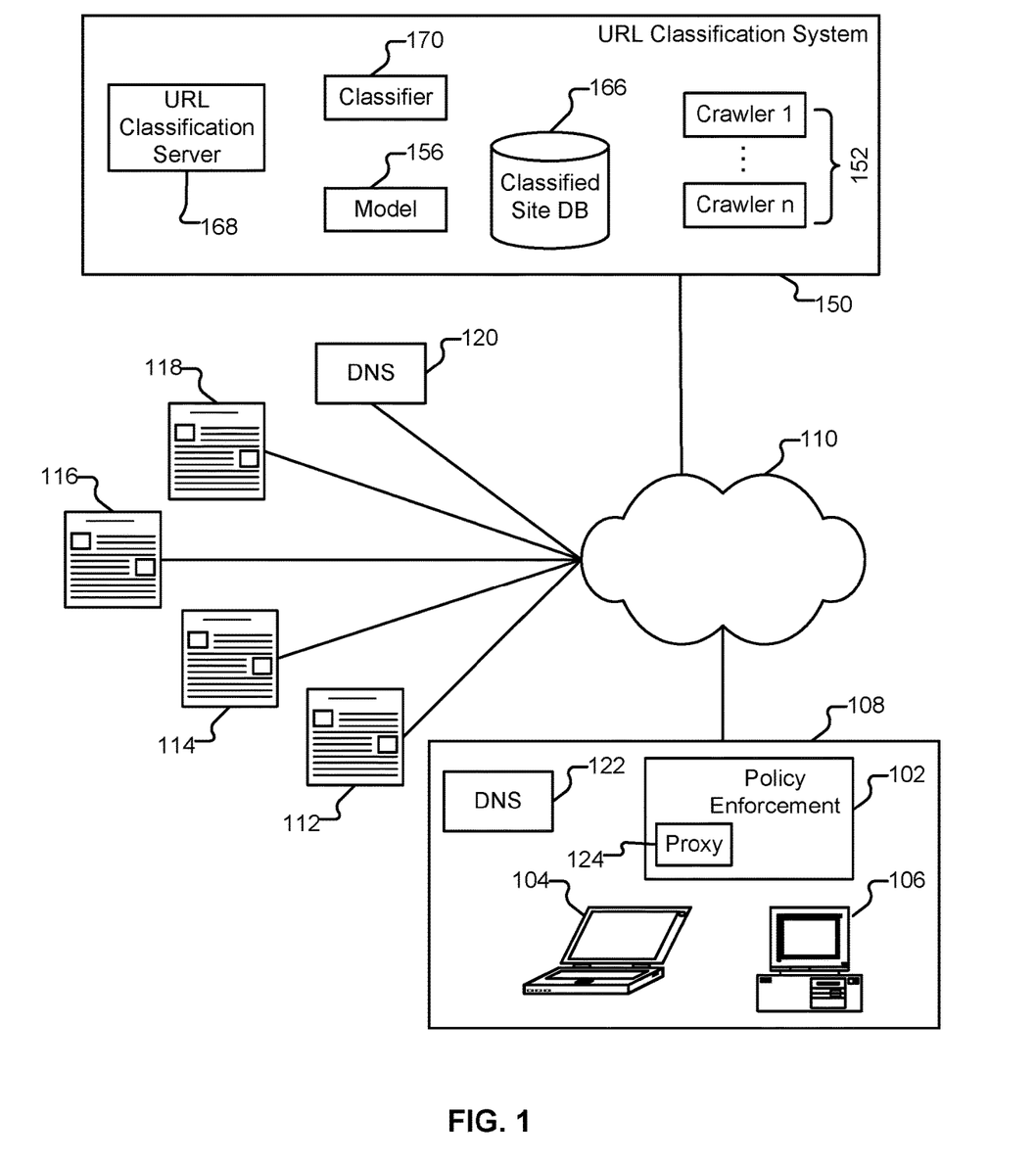
FIG. 1 illustrates an embodiment of an environment in which policies that include hostname information are enforced.

FIG. 1 illustrates an embodiment of an environment in which policies that include hostname information are enforced. The environment shown in FIG. 1 includes a domain classification system 150. Domain classification system 150 uses a set of crawlers 152 to crawl sites (e.g., sites 112-118), extract metadata/content, and store information associated with the crawled sites in database 166. Examples of tools that can be used to crawl/extract content from sites include PageDump (WebKit), HtmlUnit, and j soup. Database 166 is, in various embodiments, implemented using MongoDB. Example tables that can be included in database 166 are a crawl queue (of sites to be crawled), a crawl log (a history of sites crawled), a classification result (e.g., a to-publish category, invalid site, or no category), and a crawl content report (e.g., a summary of crawled sites, language, and number of pages crawled). The information extracted for a site (e.g., title, description, body text, keywords, inlinks, outlinks, language, etc.) is used (e.g., by classifier 170) to generate a feature vector (or set of feature vectors, as applicable). One example of a feature is whether or not any of the outlinks of a site lead to sites known to be classified as ADULT sites. Other example features variously include features related to body text, features related to metadata, features related to incoming links, and features related to the URL itself.

In various embodiments, different features included in a feature vector are used in conjunction with different types of machine learning approaches incorporated into a classification model, such as model 156. Examples of such machine learning approaches include Naïve Bayes, support vector machines, random forest, logistic regression, and gradient descent boosting trees. Classifier 170 uses a model, such as model 156, to classify a given site (e.g., as NEWS, ADULT, etc.) based on its associated feature vector. In various embodiments, a model such as model 156 is trained using a training set of manually labeled websites. Categorizations determined using model 156 are stored in database 166. The contents of database 166 can be used for a variety of purposes, including generating database 312 discussed in conjunction with FIG. 3, and responding to queries (e.g., with classification server 168 being an example of remote URL classification server 320, responding to queries by consulting database 166).

In various embodiments, system 150 is implemented using commodity server-class hardware. System 150 can also be constructed using a scalable, elastic architecture, and may comprise several distributed components, including components provided by one or more third parties (e.g., using Amazon Web Services, Microsoft Azure, and/or Google Cloud Platform). Further, when system 150 is referred to as performing a task, such as storing data or processing data, it is to be understood that a sub-component or multiple sub-components of system 150 (whether individually or in cooperation with third party components) may cooperate to perform that task. Unless otherwise specified, various logical components of system 150 are generally implementable in a variety of ways, including as a set of one or more scripts (e.g., written in Java, python, etc., as applicable).

Also shown in FIG. 1 are two DNS servers (120 and 122). Typically, when attempting to access a URL, a web browser (e.g., executing on a client device) forwards a request to a DNS (Domain Name System) server (e.g., DNS server 120) to resolve the domain name of the URL into a corresponding IP (Internet Protocol) address. In response to receiving a valid IP address for a requested domain name, the client can connect to a corresponding content server (e.g., any of sites 112-118) using the IP address to request a desired resource. The content server responds with the requested resource if the requested resource is available at the content server or responds with an error message or with a redirect to another content server if the requested resource is not available at the content server.

Also shown in FIG. 1 is an example enterprise network 108. Included within network 108 are example client devices 104 and 106, which are a laptop computer and desktop computer, respectively. Enterprise network 108 further includes an enterprise DNS server 122. Enterprise DNS server 122 is configured to resolve enterprise domain names into IP addresses, and is further configured to communicate with one or more external DNS servers (e.g., DNS server 120) to resolve domain names. Also included within network 108 is a policy enforcement appliance 102. Appliance 102 is configured to enforce policies regarding communications between clients, such as clients 104 and 106, and nodes outside of enterprise network 108 (e.g., reachable via one or more external networks collectively depicted as network cloud 110).

One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or other consumption constraint. Access to other sites (e.g., news site 118) can be explicitly permitted (e.g., a rule allowing access to site 118 via URL ("www.examplenews.com") or category ("NEWS")), and can also be permitted by virtue of not being prohibited (e.g., "access to any site not prohibited is allowed"). Other types of policies can also be enforced, such as ones governing traffic shaping, quality of service, or routing with respect to a given domain, pattern including a domain (e.g., *.examplenews.com), category associated with a domain, or other hostname-associated information (e.g., URL). In some embodiments, policy enforcement appliance 102 is also configured to enforce policies with respect to traffic that stays within enterprise network 108.

The functionality provided by policy enforcement appliance 102 can be implemented in a variety of ways. Specifically, policy enforcement appliance 102 can be a dedicated device or set of devices. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable. Unless otherwise specified, various logical components of appliance 102 are generally implementable in a variety of ways, including as a set of one or more scripts (e.g., written in Java, python, etc., as applicable).

Figure 2:
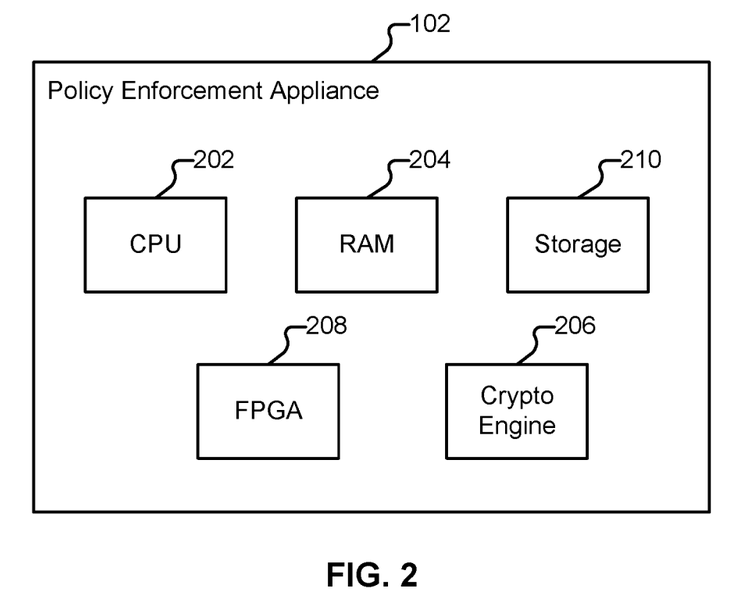
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core Central Processing Unit (CPU) 202 and Random Access Memory (RAM) 204. Appliance 102 also includes a storage 210 (such as one or more disk drives), which is used to store policy and other configuration information, as well as hostname/URL information. Appliance 102 can also include one or more optional hardware accelerators. For example, appliance 102 can include a cryptographic engine 206 configured to perform encryption and decryption operations, and one or more Field Programmable Gate Arrays (FPGAs) 208 configured to perform matching, act as network processors, and/or perform other tasks.

Figure 3:
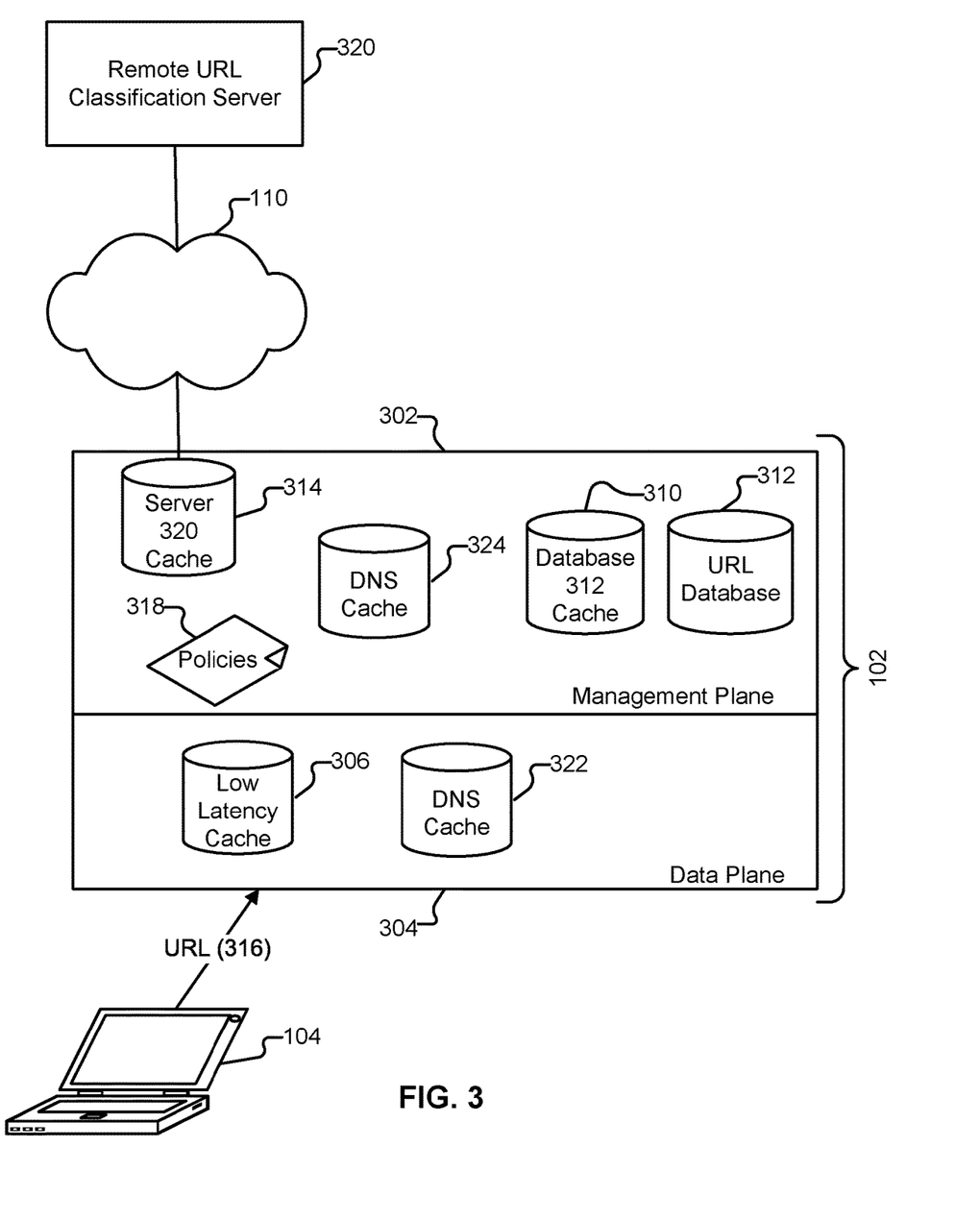
FIG. 3 illustrates an embodiment of a policy enforcement appliance.

FIG. 3 illustrates an embodiment of a policy enforcement appliance. In the example shown, the functionality of policy enforcement appliance 102 is implemented in a firewall. Specifically, appliance 102 includes a management plane 302 and a data plane 304. The management plane is responsible for managing user interactions, such as by providing one or more user interfaces for configuring policies (318), reporting problems, and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 302, or as presented by management plane 302 to a remote URL classification server 320).

As mentioned above, one task performed by appliance 102 is URL filtering. Suppose network 108 belongs to a company hereinafter referred to as "ACME Corporation." Specified in appliance 102 is a set of policies 318, some of which govern the types of websites that ACME employees may access, and under what conditions. As one example, included in appliance 102 is a policy that permits employees to access news-related websites. Another policy included in appliance 102 prohibits, at all times, employees from accessing pornographic websites. Also included in appliance 102 is a database (312) of URLs and associated categories. Other information can also be associated with the URLs in database 312 instead of or in addition to category information, and that other information can be used in conjunction with policy enforcement.

In some embodiments, database 312 is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. The URLs stored in database 312 (or transformations thereof) represent the top n URLs for which access is most likely to be sought by users of client devices, such as client 104, where n can be configured based on the computing and other resources available to appliance 102. As one example, an embodiment of database 312 includes 20 million URLs and is stored in storage 210. In various embodiments, appliance 102 includes various caches (e.g., 306, 310, 314, 322, and 324), loaded into RAM 204. In some embodiments, all or some of caches 306, 310, 314, 322, and 324 are omitted from appliance 102 and the processing described herein is adapted accordingly. In other embodiments, additional caches are included in appliance 102, as applicable. Additional detail regarding components shown in FIG. 3 will be provided below.

When a user of client 104 (an employee referred to hereinafter as "Alice") attempts to engage in activities such as web surfing, communications from and to client 104 pass through policy enforcement appliance 102. As one example, suppose Alice has launched a web browser application on client 104 and would like to visit an arbitrary web page. Appliance 102 is configured to evaluate the URL of the site Alice would like to visit (e.g., URL 316) and determine whether access should be permitted.

Suppose Alice would like to visit site 118, the website of a national newspaper, and enters that URL into her browser ("www.examplenews.com"). In some embodiments, the URL (316) is evaluated by appliance 102 as follows. In the first stage of the evaluation, the data plane 304 consults cache 306 for the presence of URL 316 (the results of which are indicative of whether appliance 102 has previously received a request to access site 118 within cache resource constraints). If the URL is present in cache 306, the associated category that is also stored in cache 306 is used to enforce any applicable policies 318 (e.g., allowing Alice access to site 118). If the URL is not present in cache 306, a temporary entry is inserted into cache 306 indicating that the URL is being resolved. As one example, a URL being resolved is assigned a temporary category of "UNRESOLVED." Additional requests received by appliance 102 for access to site 118 (e.g., received from another user such as "Bob," a user of device 106) will be queued pending the resolution. In various embodiments, a timeout condition is placed on UNRESOLVED entries included in cache 306, such that if the entry is not updated within a specified period of time, the entry is removed.

Assuming URL 316 remains unresolved, data plane 304 sends a request to management plane 302 for an evaluation of URL 316. URL 316 is transformed as applicable (e.g., an MD5 hash of URL 316 is computed). For the remainder of the discussion of this example, no distinction will be made between a URL and the MD5 (or other transformation) of a URL, to aid in clarity. It is to be assumed that if database 312 stores MD5 hashes, the queries performed against it will be performed using MD5 (or other applicable) transformations of URLs.

In some embodiments, cache 310 is evaluated for the presence of URL 316 (indicative of whether database 312 was previously queried for URL 316 within cache resource constraints). Suppose URL 316 is not present in cache 310. A query of database 312 is performed using URL 316. If it is assumed that URL 316 is present in database 312, the corresponding category NEWS is returned and ultimately provided to data plane 304, which will update the entry in cache 306 by changing the UNRESOLVED category to NEWS. The category will be used by the firewall to enforce any applicable rules. In this case, for example, Alice's attempt to access URL 316 with her browser would be permitted (her session would not be terminated by appliance 102), because her request is associated with an attempt to access a NEWS site, which is a permissible use. Cache 310 is also updated to include the returned category and URL 316 (i.e., its MD5 hash).

Now suppose that a query of database 312 for URL 316 fails. The next phase of evaluation performed by the management plane is to consult cache 314 to see if URL 316 is present therein. Cache 314 is associated with queries performed by appliance 102 against a set of one or more remote URL classification servers. As with the previous phases, if URL 316 is present in cache 314, the corresponding category (e.g., "NEWS") will be returned as a result and can be used by the firewall in policy enforcement (and included in cache 306). If URL 316 is also absent in cache 314, one or more remote URL classification servers, such as URL classification server 320, are queried. In some embodiments, server 320 is an Amazon Cloud URL query server, which queries URL category information using a Trie structure lookup. In some embodiments, URL classification server 320 is made available by the provider of the contents of database 312, and contains URL information that supplements the information included in database 312 (e.g., by including many millions of additional URLs and corresponding categories). As one example, URL classification server 320 can be provided by URL classification system 150 (e.g., as component 168). URL classification server 320 can also be under the control of the owner of appliance 102 or any other appropriate party. Further, a set of multiple URL classification servers can be queried by appliance 102, whether in parallel, in sequence (e.g., if a first queried URL classification server has no results, appliance 102 contacts a different URL classification server), selectively, etc.

In the event that URL 316 is also absent from URL server 320 (and any additional URL servers available to appliance 102 as applicable), a category of UNKNOWN will be returned and appropriate policies applied, based on the category, such as by blocking access to URL 316. Cache 306 can also be updated by switching the temporary category of UNRESOLVED to UNKNOWN. As with cache 310, cache 314 is updated based on results returned by URL server 320. In some embodiments, URLs with UNKNOWN categorization have a timeout, thus allowing for resolution of the categorization during a subsequent request.

Hostname Validation and Policy Evasion Prevention

In various embodiments, appliance 102 relies on HTTP Host headers of client GET requests and/or TLS Server Name Indicators (SNIs) of the client hello to determine URL categorization (e.g., for enforcing policies against web browsing traffic), and to assist with application identification, as applicable. A spoofed hostname in a client request could potentially lead to a situation in which the appliance incorrectly classifies the site the client is attempting to contact, which could result in the appliance applying an incorrect rule. As one example, suppose an attacker or malicious user crafts an artificial HTTP Host header (e.g., creating a spoofed HTTP GET request with www.google.com as the Host header), but establishes the actual TCP session with a completely different server (e.g., pornographic site 112). If the spoofing attempt was successful, appliance 102 would classify the application as a Google application and the URL category to be search engines. A similar scenario also applies to a TLS session in which an attacker could use the host name of a system associated with an allowed App-ID or URL category in the SNI field. (The HTTP Host header and SNI are both referred to herein as "host headers.")

The following are three example scenarios that can result when the above-described hostname spoofing is not addressed. As will be described in more detail below, appliance 102 incorporates protections against such spoofing attempts, and can thus mitigate the effects of such spoofing attempts.

Scenario 1 (Malicious End User): A malicious end user (e.g., an employee) could install a browser plugin (e.g., on client device 106) to modify HTTP Host headers, or use a browser in a development mode which allows for the injection/overriding of HTTP headers. The user could then bypass URL filtering policies to access adult or other inappropriate content (e.g., from client device 106). Alternately, the user could attempt to exfiltrate data by bypassing file blocking or data filtering profiles applicable to certain URL categories (e.g., uploading corporate documents to unsanctioned online storage services or webmail systems).

Scenario 2 (Exploit Kits): An attacker could craft an exploit and use Host header information of trusted URL categories to download additional malware for host compromise. As one example, an attacker could use an SNI value to mimic a request to a financial services web page, which customers usually do not decrypt and therefore is not inspected.

Scenario 3 (Command and Control): An attacker could craft malware that either places www.google.com in the SNI or Host header of an HTTP request to establish a command and control channel. Either of these sessions would appear, in traffic logs kept by the appliance, as a benign application associated with Google and a URL category of search-engine.

As will be described in conjunction with FIG. 4, in various embodiments, appliance 102 is configured to perform validation of host information (e.g., of an HTTP or TLS client request) against the destination IP address of a session. For example, appliance 102 can be configured to provide DNS functionality/DNS resolution capabilities, and/or to act as a DNS resolver for a client. Appliance 102 compares the DNS resolution of a given HTTP Host header or SNI to the destination address of the corresponding session. If the DNS record of a given HTTP Host header or SNI does not match the destination IP address of the session, a vulnerability signature (e.g., Anti-Spyware signature or other signature) is triggered (e.g., "Host Header mismatch"), and a configured action is executed (e.g., log, warn, drop session). The comparison of the session destination address and the host header information can be performed out of band, meaning that the session setup (and resulting ongoing session) is unaffected unless a mismatch is determined (in which case an existing session could be terminated as one of the possible policy actions that can be configured).

In the following discussion, suppose (per example Scenario 1 above) Bob would like to use client device 106 to access content on pornographic site 112 (against ACME policy). Using techniques described herein, appliance 102 will be able to determine that the hostname included in Bob's HTTP Host header is invalid and prevent him from accessing pornographic content.

In various embodiments, appliance 102 executes a DNS proxy service. When Bob attempts to communicate with pornographic website 112, a DNS request is received by DNS proxy service 124, which provides a response back to client 106. As applicable, the response is cached (e.g., in caches 322 and/or 324 as described in more detail below). A new HTTP session is established by client 106 with website 112 and the HTTP Host header is extracted. Additional information regarding DNS proxy service 124 is provided below.

If Bob attempts to access site 112 directly (e.g., by entering the site's domain in his browser's URL bar), appliance 102 will determine (by examining the extracted HTTP Host header) that he is attempting to access a site classified as ADULT and prevent him from doing so (e.g., by dropping the session established between client 106 and site 112). Suppose Bob attempts to circumvent the protections provided by appliance 102 by installing a browser plugin that lets him modify HTTP Host headers. In particular, suppose that Bob has configured his browser (via the installed plugin) to substitute the hostname of an allowed site (e.g., site 118) for the hostname of site 112 in the HTTP Host header (but still attempt to connect to site 112).

In various embodiments, appliance 102 performs an out of band validation of the data in the HTTP Host header provided by client 106 (meaning that appliance 102 does not modify the HTTP session establishment described above). In particular, appliance 102 (via a set of one or more scripts) performs a DNS lookup (using the DNS proxy service) using the HTTP Host header. In this example, appliance 102 would perform a DNS lookup for site 118, as site 118 was included in the HTTP Host header by Bob's browser. The destination IP address of client 106's session (here, the IP address of site 112) is compared to the IP address(es) returned by the DNS proxy service (the IP address of site 118). A mismatch between the destination IP address of the session (e.g., the IP address of site 112) and the result of the DNS lookup (the IP address of site 118) triggers a signature (e.g., "Host header mismatch"), and the configured actions performed (e.g., logging the client IP, destination IP, and spoofed hostname).

Figure 4:
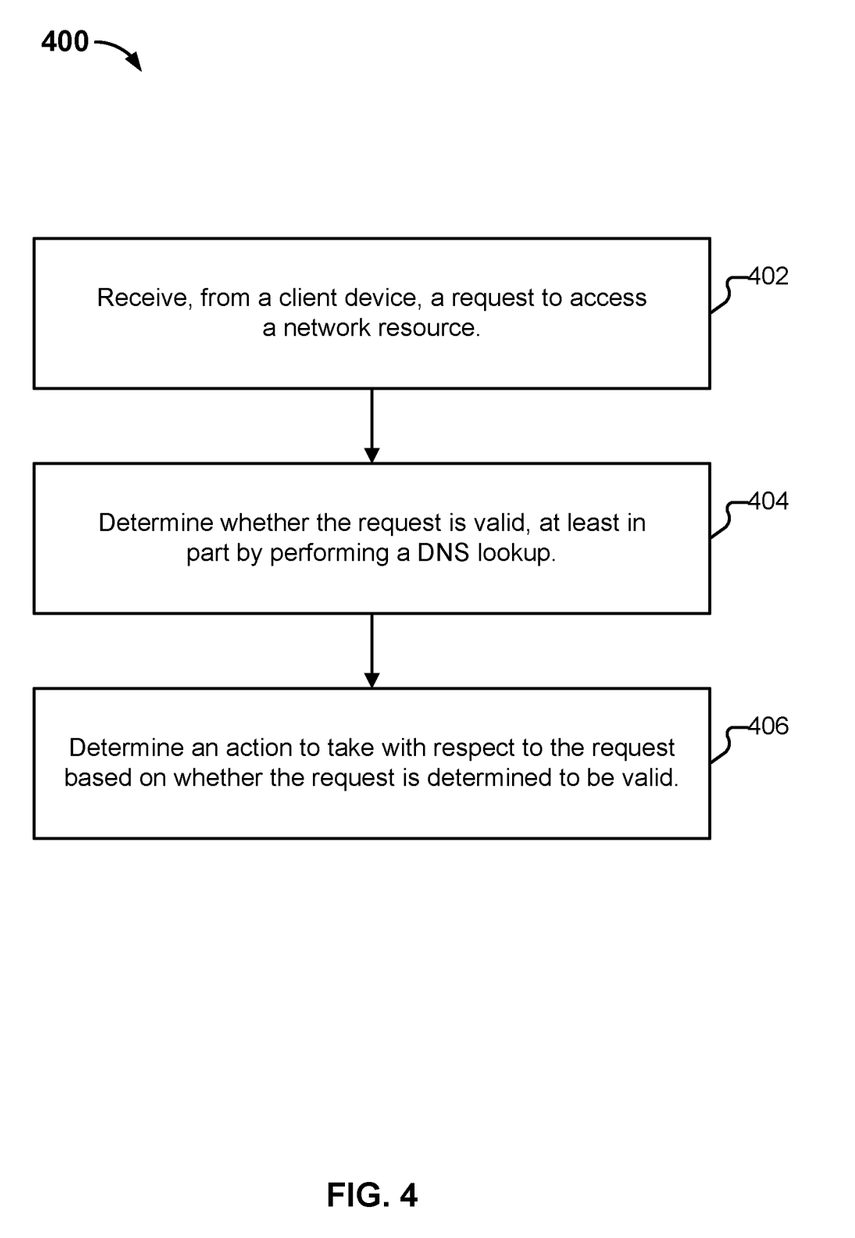
FIG. 4 illustrates an embodiment of a process for mitigating hostname-spoofing-related policy evasion.

FIG. 4 illustrates an embodiment of a process for mitigating hostname-spoofing-related policy evasion. In various embodiments, process 400 is performed by appliance 102. Process 400 begins at 402 when a request is received from a client device to access a network resource. As one example, appliance 102 receives a request at 402 when Bob's client 106 attempts to contact site 112 (with a spoofed HTTP Host header). At 404, a determination is made as to whether the request is valid, at least in part by performing a DNS lookup. As one example of the processing performed at 404, appliance 102 performs a DNS lookup of the HTTP Host header and compares the result to the destination IP address of the client device's session.

An appropriate action can be taken based on whether there is a mismatch between the hostname in the resolved HTTP Host header, and the destination IP address of the client device's session (406). As mentioned above, one approach is for a mismatch to trigger a signature (and take a configured action). Two example signatures are as follows, one for a detected HTTP Host header mismatch, and one for a detected SNI mismatch.

Example Signature: "HTTP Host Header Evasion"
Description: "Possible policy evasion attempt through spoofed HTTP Host header."
Is triggered when a DNS A or AAAA record lookup on the HTTP Host header of an HTTP session does not match the session destination IP (either the record is different from the destination IP address, or the record is not found (NXDOMAIN)).
Category is "evasion."
Severity is "informational."
Default action is "allow" (the session to continue).
Packet Capture is "disabled."

Example Signature: "TLS Server Name Indicator Evasion"
Description: "Possible policy evasion attempt through spoofed Server Name Indicator."
Is triggered when a DNS A or AAAA record lookup on the Server Name Indicator of a TLS client hello does not match the session destination IP (either the record is different from the destination IP address, or the record is not found (NXDOMAIN)).
Category is "evasion."
Severity is "informational."
Default action is "allow" (the session to continue).
Packet Capture is "disabled."

Additional Information Regarding DNS Proxying

In some embodiments, DNS resolution performed by appliance 102 is implemented using a specific distributed cache on the data plane (322) and management plane (324) which parallels the URL categorization caches described above. The distributed DNS cache is populated/updated through two main mechanisms. The first is through client DNS requests to proxy 124 prior to the session being established. In this scenario, clients pre-populate cache 324. For example, a client would first send a DNS query for www.example.com (when attempting to connect to www.example.com). Once resolved, the client would send an HTTP request to www.example.com. In that case, www.example.com should be in the DNS proxy cache 324 on the management plane. This ensures that when data plane 304 needs to resolve www.example.com, it should be a low latency query as opposed to sending to an external DNS server. A second source of cache population (e.g., as another/fallback mechanism) is through a DNS lookup by appliance 102 itself either through proxy 124 or the configured DNS server (e.g., 122) while the session is established. If a DNS record is not present in the distributed cache (i.e., not present in either of caches 322 or 324), the hostname included in the host header is resolved (e.g., externally).

When a client sends a request to DNS proxy 124, the DNS proxy makes requests to a DNS server (e.g., 120) on behalf of the client. Results are cached in the distributed cache for the lifetime of the TTL (where the TTL value is the value used by the upstream DNS).

In various embodiments, for a given session, if DNS results are not cached in cache 322, or if the results have expired, the hostname validation for that session will be best effort. This means that appliance 102 will allow packets, and mark the session as pending hostname validation. For packets that follow, "post validation" can be performed with the saved hostname (e.g., in session or URL cache). If DNS results arrive before the session ends, the next packet will trigger a session block or alert. This situation can happen for the first session with a hostname for which information is not present in cache 322, or if the cache entry in cache 322 has expired or was pushed out due to capacity. In these cases, data plane 304 will send a DNS request to management plane 302. Management plane 302 will respond with either information from its DNS cache 324 or results of an external lookup, which can be inserted into cache 322 (and cache 324), allowing subsequent sessions with that hostname to be validated with configured actions.

In some embodiments, appliance 102 (or portions thereof) is virtualized, with multiple virtualizations present on the same system. In such a situation, proxy 124 can be shared across all virtual systems, or DNS proxy settings can be localized to a specific virtual system, if desired.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        receive, from a client device, a request to establish a session with a first server, wherein the first server is associated with a first hostname, and wherein the request includes information identifying a second hostname purported to correspond to the first server;
        perform a Domain Name System (DNS) lookup using the second hostname, and determine that the second hostname was spoofed by the client device based on a response to the DNS lookup, wherein the response indicates that the first server is not associated with the second hostname; and
        in response to the determining that the request received from the client device includes the spoofed second hostname, determine that the client device has injected or overridden at least one of an HTTP Host header and a Server Name Indicator in the request in an attempt to circumvent a policy enforceable against communications between the client device and the first server, and determine an action to take with respect to the client device; and
    a memory coupled to the processor and configured to provide the processor with instructions.

2. The system of claim 1 wherein the second hostname is included by the client device in the HTTP Host header in a client GET request.

3. The system of claim 1 wherein the second hostname is included by the client device in the Server Name Indicator in a TLS client hello.

4. The system of claim 1 wherein the performing the DNS lookup includes querying a cache.

5. The system of claim 1 wherein the determining that the second hostname was spoofed by the client device includes comparing a result of the DNS lookup to a destination IP address of a session between the client device and the first server.

6. The system of claim 1 wherein the DNS lookup is performed out of band from the client device establishing the session with the first server.

7. The system of claim 1 wherein, in response to the determining that the request received from the client device includes the spoofed second hostname, the client device is prevented from accessing the first server.

8. The system of claim 7 wherein the client device is prevented from accessing the first server by resetting an established session between the client device and the first server.

9. The system of claim 1 wherein, in response to the determining that the request received from the client device includes the spoofed second hostname, an alert is generated.

10. The system of claim 1 wherein, in response to the determining that the request received from the client device includes the spoofed second hostname, a log entry is generated.

11. The system of claim 1 wherein the processor is further configured to cache a result of the DNS lookup.

12. The system of claim 1 wherein the first hostname and the second hostname have respective first and second categorizations, and wherein the processor is configured to block access by the client device to resources associated with the first categorization and allow access by the client device to resources associated with the second categorization.

13. A method, comprising:
    receiving, from a client device, a request to establish a session with a first server, wherein the first server is associated with a first hostname, and wherein the request includes information identifying a second hostname purported to correspond to the first server;
    performing a Domain Name System (DNS) lookup using the second hostname, and determining that the second hostname was spoofed by the client device based on a response to the DNS lookup, wherein the response indicates that the first server is not associated with the second hostname; and
    in response to the determining that the request received from the client device includes the spoofed second hostname, determining that the client device has injected or overridden at least one of an HTTP Host header and a Server Name Indicator in the request in an attempt to circumvent a policy enforceable against communications between the client device and the first server, and determining an action to take with respect to the client device.

14. The method of claim 13 wherein the second hostname is included by the client device in the HTTP Host header in a client GET request.

15. The method of claim 13 wherein the second hostname is included by the client device in the Server Name Indicator in a TLS client hello.

16. The method of claim 13 wherein the performing the DNS lookup includes querying a cache.

17. The method of claim 13 wherein the determining that the second hostname was spoofed by the client device includes comparing a result of the DNS lookup to a destination IP address of a session between the client device and the first server.

18. The method of claim 13 wherein the DNS lookup is performed out of band from the client device establishing the session with the first server.

19. The method of claim 13 wherein, in response to the determining that the request received from the client device includes the spoofed second hostname, the client device is prevented from accessing the first server.

20. The method of claim 19 wherein the client device is prevented from accessing the first server by resetting an established session between the client device and the first server.

21. The method of claim 13 wherein, in response to the determining that the request received from the client device includes the spoofed second hostname, an alert is generated.

22. The method of claim 13 wherein, in response to the determining that the request received from the client device includes the spoofed second hostname, a log entry is generated.

23. The method of claim 13 wherein the first hostname and the second hostname have respective first and second categorizations, and further comprises blocking access by the client device to resources associated with the first categorization and allowing access by the client device to resources associated with the second categorization.

24. A computer program product embodied in a tangible non-transitory computer readable storage medium and comprising computer instructions for:

receiving, from a client device, a request to establish a session with a first server, wherein the first server is associated with a first hostname, and wherein the request includes information identifying a second hostname purported to correspond to the first server;

performing a Domain Name System (DNS) lookup using the second hostname, and determining that the second hostname was spoofed by the client device based on a response to the DNS lookup, wherein the response indicates that the first server is not associated with the second hostname; and in response to the determining that the request received from the client device includes the spoofed second hostname, determining that the client device has injected or overridden at least one of an HTTP Host header and a Server Name Indicator in the request in an attempt to circumvent a policy enforceable against communications between the client device and the first server, and determining an action to take with respect to the client device.

* * * * *

UNITED STATES PATENT AND TRADEMARK OFFICE
CERTIFICATE OF CORRECTION

PATENT NO. : 10,505,985 B1
APPLICATION NO. : 15/486204
DATED : December 10, 2019
INVENTOR(S) : Martin Walter, Charles Bransi and Suiqiang Deng It is certified that error appears in the above-identified patent and that said Letters Patent is hereby corrected as shown below:

In the Specification

In Column 3, Line(s) 58 & 59, delete "j soup" and insert --jsoup--, therefor.

Signed and Sealed this
Twenty-third Day of June, 2020

Andrei Iancu
*Director of the United States Patent and Trademark Office*